H. W. TERRY & J. W. FOWLER.
PNEUMATIC VALVE ACTUATING DEVICE.
APPLICATION FILED SEPT. 5, 1917.
1,279,786.
Patented Sept. 24, 1918.
2 SHEETS—SHEET 2.
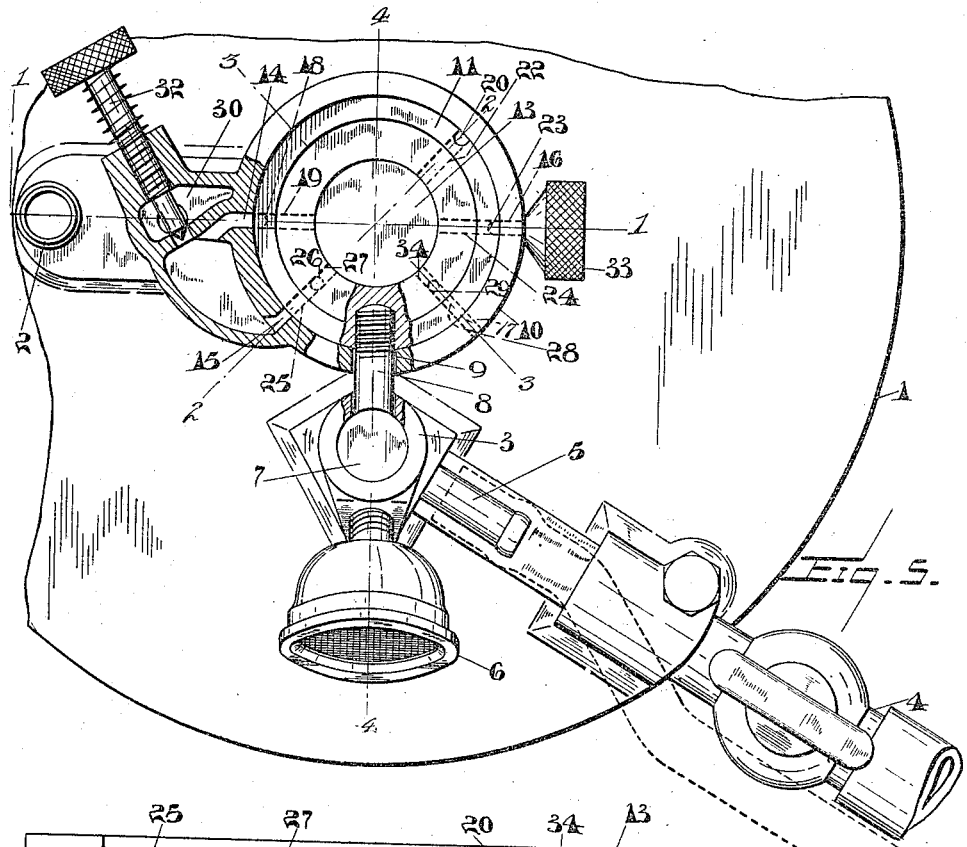
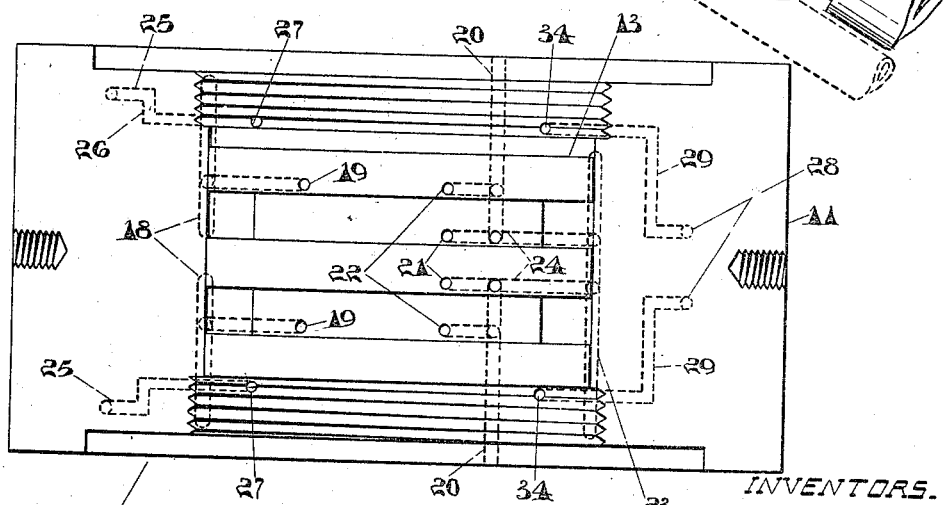
INVENTORS.
H. W. Terry
J. W. Fowler
BY J. Edward Maybee.
ATTY.

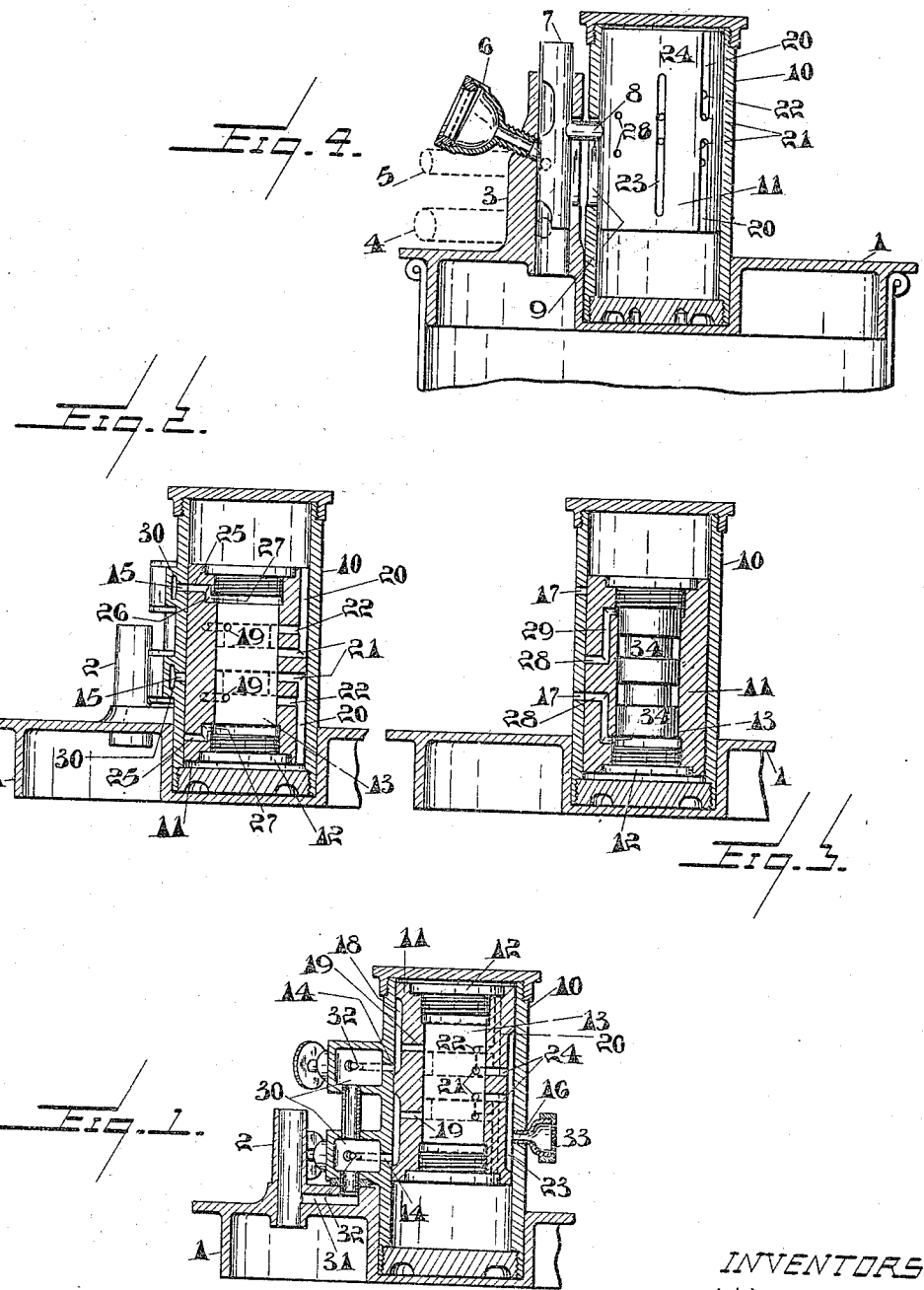

UNITED STATES PATENT OFFICE.

HENRY WM. TERRY AND JOHN W. FOWLER, OF TORONTO, ONTARIO, CANADA.

PNEUMATIC VALVE-ACTUATING DEVICE.

1,279,786.   Specification of Letters Patent.   Patented Sept. 24, 1918.

Application filed September 5, 1917. Serial No. 189,785.

*To all whom it may concern:*

Be it known that we, HENRY WM. TERRY and JOHN WILLIAM FOWLER, of the city of Toronto, in the county of York, Province of Ontario, Canada, have invented certain new and useful Improvements in Pneumatic Valve-Actuating Devices, of which the following is a specification.

In certain milking apparatus a valve requires to be reciprocated to cause alternation of suction and atmospheric pressure in the teat cups. Automatic pneumatic means for reciprocating such a valve are now commonly employed, but with such apparatus as now constructed the periods of suction are each equal in length to any period of atmospheric pressure.

Our object therefore is to devise means whereby the lengths of the periods of suction and of atmospheric pressure may be varied at will to increase and decrease the rate of milking and the ratio of a period of suction to the following period of atmospheric pressure.

We attain our object by means of the constructions hereinafter described and illustrated in the accompanying drawings in which:—

Figure 1 is a vertical section of our improved device taken on the line 1—1 in Fig. 5;

Fig. 2 a vertical section taken on the line 2—2 in Fig. 5 with the parts in a different position;

Fig. 3 is a vertical section taken on the line 3—3 in Fig. 5 with the parts in the same position as in Fig. 2;

Fig. 4 a section on the line 4—4 in Fig. 5 with the parts in the same position as in Fig. 1;

Fig. 5 a plan view partly broken away and partly in section showing our device as applied to a pail cover of a milking machine; and Fig. 6 a development of the piston and piston valve showing particularly the relative positions of the ports.

In the drawings like numerals of reference indicate corresponding parts in the different figures.

1 is a milk pail cover, which in practice fits in an air tight manner on a milk pail, 2 a nipple to which may be connected the hose from a vacuum pump so that a vacuum may be created within the milk pail, and 3 a cylinder which has connected thereto the milk pipe connection 4 and the nipple 5 to which may be connected a rubber pipe conveying atmospheric pressure to the teat cups.

6 is a strainer through which atmospheric pressure may pass to the nipple 5 when the valve 7 within the cylinder is in proper position. When the valve is up as shown in Fig. 4, there is connection between the interior of the pail and the milk pipe connection 4. When the valve is down, the milk pipe is closed off to vacuum within the pail and the nipple 5 open to atmospheric pressure. This valve 7 is operated by means of a stud 8 which projects through a slot 9 in the side of the cylinder 10 and is connected with the hollow piston 11.

The hollow piston is provided with removable ends 12 adapted to be screwed into the piston. Within the piston a piston valve 13 is longitudinally slidable. This piston valve has two annular grooves formed therein.

In the walls of the cylinder 10 are formed the following ports, two vacuum ports 14, one for each end of the interior of the cylinders; a vacuum port 15 for each end of the interior of the piston; an air port 16 through which air may pass to each end of the cylinder as hereinafter described; and air ports 17 for each end of the interior of the piston.

The exterior surface of the hollow piston is provided with two grooves 18 extending in alinement from a point near each end of the cylinder to a point near the middle. These grooves are thus entirely separate and register with the vacuum ports 14. From each groove a port 19 extends through to the interior of the piston.

At the opposite side of the cylinder are formed alined grooves 20 extending from a point near the middle of the piston clear through to each end. From each groove 20 two ports 21 and 22 extend through to the interior of the piston.

In the side of the piston is also formed a groove 23, which does not extend through to the ends of the piston. From this groove, which is in alinement with the air port 16, two ports 24 extend through to the interior of the piston. Two ports 25 extend into the wall of the piston, which ports are in vertical alinement with the vacuum ports 15. These ports connect with passages 26 formed in the walls of the piston communicating with ports 27 leading into the interior of the piston adjacent each end. In vertical alinement with the air ports 17 are formed two ports 28, each port communicating by means of a passage 29 with a port 34 leading into the interior of the hollow piston just within its ends. The vacuum ports 14 and 15 each communicate with a branch 30 of a suction conduit 31 communicating through the cover with the interior of the pail, so that vacuum created within the pail may operate through the suction conduit. Each branch is controlled by a needle valve 32 so that the flow of air through either branch may be restricted as may be desired.

The air port 16, it will be noted, is provided with the strainer 33.

The operation of the device is as follows: Assuming the piston to have reached its lower limit of movement, the upper vacuum port 15 comes into alinement with the port 25 in the hollow piston. Communication through the passage 26 and port 27 is thus formed with the interior of the piston above the piston valve 13. At the same time the lower port 28 is in alinement with the lower air port 17, so that through the port 28, the passage 29 and the port 34 communication is established between the atmosphere and the under side of the piston valve. As there is a vacuum above this valve, the valve promptly rises. There is then communication between the upper vacuum port 14 and the upper groove 18 through the upper port 19, through the upper annular groove of the piston valve, from this annular groove through the upper port 22 in the upper groove 20 and through this groove to the upper part of the cylinder. Vacuum is thus allowed to act above the piston.

Air is admitted to the lower side of the piston as follows: The air passes through the air port 16 into the groove 23, thence through the air port 24 into the interior of the hollow piston and the lower annular groove of the piston valve. From this groove it passes through the port 21 through the lower groove 20 to the lower end of the piston, which then moves up. When the piston reaches the upper end of its stroke, the piston valve shifts and the piston starts to move down following the reversal of the positions of the control. The reciprocating movement of the piston will thus be maintained as long as suction exists in the suction conduit 31. It will be noted that absolutely independent connections are provided for the admission of the suction to the opposite ends of the piston, and hence it follows that by adjusting the needle valves 32 a slow stroke in one direction and a quick stroke in the other direction may be obtained, and the action thus adapted to the requirements of the cow with which the apparatus is being employed.

Various modifications might, of course, be made in the arrangement of the ports and passages which would fall within the scope of our invention as long as the independent control of the suction at the opposite ends of the piston is retained.

What we claim as our invention is:

1. The combination of a cylinder; a hollow piston movable therein; a piston valve movable in the hollow piston, the cylinder being provided with a vacuum port for each end of the cylinder, a vacuum port for each end of the interior of the piston, and air ports for each end of the cylinder and each end of the interior of the piston, the piston being adapted to control the ports to change the position of the piston valve and the piston valve in coöperation with the piston to control the opening of the cylinder at its opposite ends to vacuum or atmospheric pressure; and means for independently controlling the vacuum ports for the cylinder ends.

2. The combination of a cylinder; a hollow piston movable therein; a piston valve movable in the hollow piston, the cylinder being provided with a vacuum port for each end of the cylinder, a vacuum port for each end of the interior of the piston, and air ports for each end of the cylinder and each end of the interior of the piston, the piston being adapted to control the ports to change the position of the piston valve and the piston valve in coöperation with the piston to control the opening of the cylinder at its opposite ends to vacuum or atmospheric pressure; a suction conduit having two branches each branch serving a vacuum port for the cylinder and a vacuum port for the hollow piston; and two valves each controlling one of said branches.

Signed at Toronto this 28th day of May, 1917.

HENRY WM. TERRY.
JOHN W. FOWLER.